US012804107B2

(12) United States Patent
Terrell

(10) Patent No.: US 12,804,107 B2
(45) Date of Patent: Nov. 17, 2026

(54) METHODS AND SYSTEMS FOR CONTROLLING CAMERA DEVICES

(71) Applicant: Kyekyenika Terrell, Douglasville, GA (US)

(72) Inventor: Kyekyenika Terrell, Douglasville, GA (US)

(*) Notice: Subject to any disclaimer, the term of this patent is extended or adjusted under 35 U.S.C. 154(b) by 0 days.

(21) Appl. No.: 19/014,577

(22) Filed: Jan. 9, 2025

(65) Prior Publication Data

US 2026/0197425 A1 Jul. 9, 2026

(51) Int. Cl.
*H04N 7/18* (2006.01)
*H04N 23/66* (2023.01)

(52) U.S. Cl.
CPC ............ *H04N 7/188* (2013.01); *H04N 23/66* (2023.01)

(58) Field of Classification Search
CPC ............................... H04N 7/188; H04N 23/66
USPC ......................................................... 348/158
See application file for complete search history.

(56) References Cited

U.S. PATENT DOCUMENTS

| | | | | |
|---|---|---|---|---|
| 9,147,008 B2 | 9/2015 | Griffin | | |
| 9,775,520 B2 | 10/2017 | Tran | | |
| 9,912,901 B2 | 3/2018 | Thompson | | |
| 12,232,851 B2 * | 2/2025 | Cho | ..................... | A61B 5/0205 |
| 12,348,909 B1 * | 7/2025 | Rognstad | ............. | A01G 25/167 |
| 12,521,022 B2 * | 1/2026 | Stadler | ................. | A61B 5/0205 |

* cited by examiner

*Primary Examiner* — Trang U Tran
(74) *Attorney, Agent, or Firm* — Ballard Spahr LLP

(57) ABSTRACT

Methods and systems are described that are configured for controlling camera devices associated with a user. One or more sensors may be affixed to one or more locations of a user. The one or more sensors may provide sensor data associated with the user. Based on the sensor data indicating one or more conditions associated with the user, one or more camera devices may be activated to video data of an environment in a field of view of each camera device of the one or more camera devices. The video data may be stored on a storage device or output as a live video stream to one or more user devices.

20 Claims, 5 Drawing Sheets

METHODS AND SYSTEMS FOR CONTROLLING CAMERA DEVICES

BACKGROUND

Conventional digital body cameras are capable of recording high definition (HD) video and storing the video locally on storage devices of the digital body cameras. These digital body cameras have been used to capture video of a surrounding environment related to an individual wearing these digital body cameras. However, these conventional body cameras require a significant amount of operator interaction and maintenance to ensure that the body camera activates to capture video when needed and that the captured video is later backed-up. Moreover, these digital body cameras lack additional sensors that may be configured to monitor various attributes of the individual wearing a digital body camera. There is a need for a configurable body camera that can automatically record, maintain, store, and share important environmental and situational data.

SUMMARY

It is to be understood that both the following general description and the following detailed description are exemplary and explanatory only and are not restrictive.

Methods, systems, and apparatus for controlling camera devices associated with a user are described. One or more sensors may be affixed to one or more locations of a user. The one or more sensors may provide sensor data associated with the user. Based on the sensor data indicating one or more conditions associated with the user, one or more camera devices may be activated to capture video data of an environment in a field of view of each camera device of the one or more camera devices. The video data may be stored on a storage device or output as a live video stream to one or more user devices.

In an embodiment, disclosed are systems comprising one or more sensor devices affixed to one or more locations of a user, wherein the one or more sensor devices are configured to determine sensor data associated with the user, one or more camera devices affixed to one or more locations of the user, wherein the one or more camera devices are configured to capture video data of an environment associated with a field of view of each camera device of the one or more camera devices, and a computing device affixed to a location of the user, wherein the computing device is in communication with the one or more sensor devices and the one or more camera devices, wherein the computing device is configured to receive, from the one or more sensor devices, the sensor data associated with the user, determine, based on the sensor data associated with the user, one or more conditions associated with the user, based on the one or more conditions associated with the user, cause the one or more camera devices to activate to capture video data of the environment associated with the field of view of each camera device, and cause the video data to be stored on a storage device associated with the computing device.

In an embodiment, disclosed are methods comprising receiving, by a computing device, from one or more sensor devices, sensor data associated with a user of the computing device, determining, based on the sensor data associated with the user, one or more conditions associated with the user, based on the one or more conditions associated with the user, causing one or more camera devices to activate to capture video data of an environment associated with a field of view of each camera device of the one or more camera devices, and causing the video data to be stored on a storage device associated with the computing device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
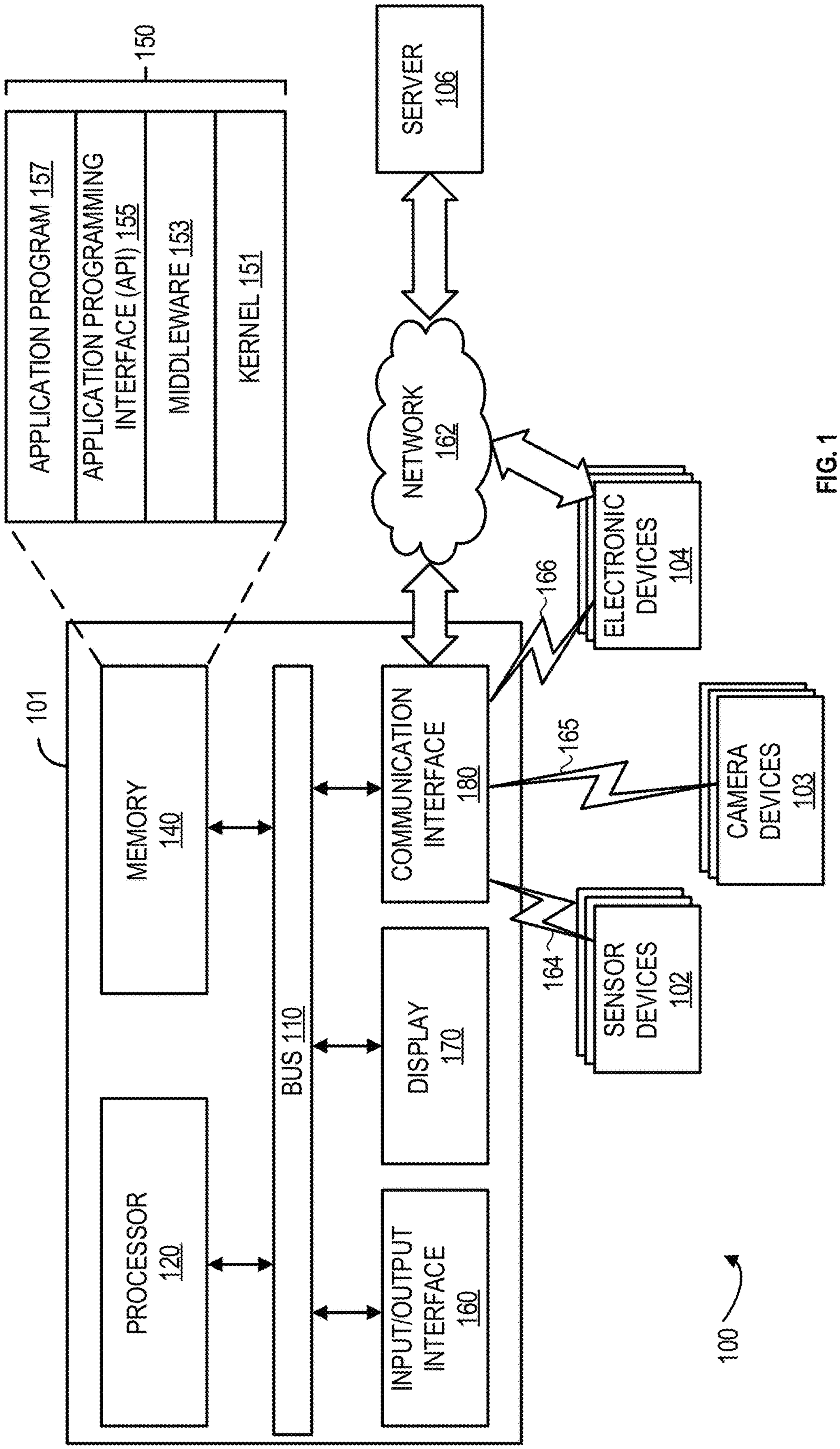
FIG. 1 shows an example system for controlling one or more camera devices.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Hereinafter, various embodiments of the present disclosure will be described with reference to the accompanying drawings. As used herein, the term "user" may indicate a person who uses an electronic device.

FIG. 1 shows an example system 100 for controlling one or more camera devices associated with a user. The system 100 may include a user device 101 configured to control one or more camera devices 103, according to various embodiments. The user device 101 may include a bus 110, a processor 120, a memory 140, an input/output interface 160, a display 170, and a communication interface 180. In an example, the user device 101 may omit at least one of the aforementioned constitutional elements or may additionally include other constitutional elements. The user device 101 may comprise one or more of a mobile device, a smartphone, a tablet computer, and/or a wearable device.

The bus 110 may include a circuit for connecting the processor 120, the memory 140, the input/output interface 160, the display 170, and the communication interface 180 to each other and for delivering communication (e.g., a control message and/or data) between the processor 120, the memory 140, the input/output interface 160, the display 170, and the communication interface 180.

The processor 120 may include one or more of a Central Processing Unit (CPU), an Application Processor (AP), and a Communication Processor (CP). The processor 120 may control, for example, at least one of the memory 140, the input/output interface 160, the display 170, and the communication interface 180 and/or may execute an arithmetic operation or data processing for communication. The processing (or controlling) operation of the processor 120 according to various embodiments is described in detail with reference to the following drawings.

The memory 140 may include a volatile and/or non-volatile memory. The memory 140 may store, for example, a command or data related to at least one different constitutional element of the user device 101. In an example, the memory 140 may store a software and/or a program 150. The program 150 may include, for example, a kernel 151, a middleware 153, an Application Programming Interface (API) 155, and/or an application program (or an "application") 157, or the like, configured for controlling one or more functions of the user device 101 and/or an external device (e.g., one or more sensor devices 102, one or more camera devices 103, and/or one or more electronic devices 104). At least one part of the kernel 151, middleware 153, or API 155 may be referred to as an Operating System (OS). The memory 140 may include a computer-readable recording medium having a program recorded therein to perform the method according to various embodiments by the processor 120.

The kernel 151 may control or manage, for example, system resources (e.g., the bus 110, the processor 120, the memory 130, etc.) used to execute an operation or function implemented in other programs (e.g., the middleware 153, the API 155, or the application program 157). Further, the kernel 151 may provide an interface capable of controlling or managing the system resources by accessing individual constitutional elements of the user device 101 in the middleware 153, the API 155, or the application program 157.

The middleware 153 may perform, for example, a mediation role so that the API 145 or the application program 157 can communicate with the kernel 151 to exchange data.

Further, the middleware 153 may handle one or more task requests received from the application program 157 according to a priority. For example, the middleware 153 may assign a priority of using the system resources (e.g., the bus 110, the processor 120, or the memory 130) of the user device 101 to at least one of the application programs 157. For example, the middleware 153 may process the one or more task requests according to the priority assigned to at least one of the application programs, and thus, may perform scheduling or load balancing on the one or more task requests.

The API 155 may include at least one interface or function (e.g., instruction), for example, for file control, window control, video processing, or character control, as an interface capable of controlling a function provided by the application 157 in the kernel 151 or the middleware 153.

The application program 157 may include logic (e.g., hardware, software, firmware, etc.) that may be implemented for controlling the user device 101, wherein the user device may control one or more camera devices 103. The user device 101 may receive sensor data, associated with a user of the user device 101, from one or more sensor devices 102. The one or more sensor devices 102 may comprise one or more of a heart rate monitor, an accelerometer, a temperature sensor, and/or a GPS sensor. In an example, the user device 101, the one or more sensor devices 102, and/or the one or more camera devices 103 may be integrated into a single device. In an example, the one or more camera devices 103 may be separate devices that may be affixed to one or more locations of a user of the user device 101. For example, the one or more camera devices 103 may be integrated into a jewelry item so that it can be hidden from plane sight. The application program 157 may cause the user device 101 to determine one or more conditions associated with a user based on the sensor data. For example, the user device 101 may determine an increase in a heart rate of the user, a speed of the user, a parental override command, a location of the user, a body temperature of the user, a blood pressure of the user, or an indication of device tampering. For example, the one or more sensor devices 102 may be affixed to one or more locations of the user in order to monitor one or more characteristics of the user (e.g., heart rate, location, temperature, blood pressure, etc.). In an example, the one or more sensor devices 102 may be configured to determine whether the user device 101, the one or more sensor devices 102, and/or the camera device 103 are being tampered with. Based on the one or more conditions associated with the user, the application program 157 may cause the user device 101 to cause the one or more camera devices 103 to activate and capture video data of an environment in a field of view of each camera device 103 of the one or more camera devices 103. In an example, the one or more camera devices 103 may be activated if the one or more sensor devices 102 provide sensor data indicating an elevated, or increased, heart rate of the user of the user device 101. In an example, the one or more camera devices 103 may be activated if the one or more sensor devices 102 provide sensor data indicating that the user of the user device 101 is traveling above a threshold speed. In an example, the one or more camera devices 103 may be activated if the one or more sensor devices 102 provide sensor data indicating that the user of the user device 101 has entered or exited a location (e.g., geo-fence). In an example, the one or more camera devices 103 may be activated if the one or more sensor devices 102 provide sensor data indicating that a body temperature of the user of the user device 101 is above or below a threshold temperature. In an example, the one or more camera devices 103 may be activated if the one or more sensor devices 102 provide sensor data indicating that a blood pressure of the user of the user device 101 is above or below a threshold blood pressure level. In an example, the one or more camera devices 103 may be activated if the one or more sensor devices 102 provide sensor data indicating tampering of the user device 101, the one or more sensor devices 102, and/or the one or more camera devices 103.

In an example, the one or more conditions may be customized based on user input for triggering the one or more camera devices 103 to activate. For example, a user of the one or more electronic devices 104 may provide input for determining when to activate the one or more camera devices 103. For example, the user may provide input to apply a weight to each of the one or more conditions. As an example, the one or more electronic devices 104 may be associated with (e.g., belong to) one or more parents or adults and the user device 101 may be associated with (e.g., belong to) a child (e.g., a child of the parent). As an example, the parent may provide an override input via one of the electronic devices 104 to cause one or more of the camera devices 103 to activate (e.g., an indication to activate the one or more camera devices 103). In another example, a user of the user device 101 may activate a panic device (e.g., panic button) that causes the user device 101 to activate the one or more camera devices 103 (e.g., an indication to activate the one or more camera devices 103). In an example, a user may provide input assigning a higher weight to the body temperature of a user of the user device 101 versus a speed of the user of the user device 101. In another example, the one or more camera devices 103 may be activated based on the user device 101 exiting or entering one or more locations. For example, a user of the one or more electronic device 104 may provide input for designating one or more locations (e.g., by drawing a boundary, such as a geo-fence, via an application of the electronic device 104) for which the user may enter or exit in order to trigger the user device 101 to activate the one or more camera devices 103.

The application program 157 may cause the user device 101 to cause the video data to be stored on a storage device associated with the user device 101. In an example, the application program 157 may cause the user device 101 to output a live video stream captured by the one or more camera devices 103. For example, a parent of one of the electronic devices 104 may provide input to the electronic device 104 to cause the electronic device 104 to monitor the user device 101. In an example, the application program 157 may cause the user device 101 to send the video data to the one or more electronic devices 104. For example, when the user device 101 activates the one or more camera devices 103, the video data may be sent to the one or more electronic devices 104 in order for a parent of the one or more electronic devices 104 to monitor a child of the user device 101. As an example, the video data may be pushed to one or more users associated with a contact list stored on the user device 101 and/or the one or more electronic devices 104. As an example, the video data may be streamed via one or more social media platforms. In an example, the application program 157 may cause the user device 101 to cause the one or more camera devices 103 to activate night vision based on content of the video data. For example, night vision may be activated to enhance the video data when it determined that the environment being captured is not light enough to identify objects and/or individuals in the video data (e.g., below a brightness threshold).

The input/output interface 160 may be configured as an interface for delivering an instruction or data input from a user or a different external device(s) to the processor 120, the memory 140, the input/output interface 160, the display 170, and the communication interface 180. Further, the input/output interface 160 may output an instruction or data received from the processor 120, the memory 140, the input/output interface 160, the display 170, and/or the communication interface 180 to a different external device.

The display 170 may include various types of displays, such as, for example, a Liquid Crystal Display (LCD) display, a Light Emitting Diode (LED) display, an Organic Light-Emitting Diode (OLED) display, a MicroElectroMechanical Systems (MEMS) display, or an electronic paper display. The display 170 may display, for example, a variety of contents (e.g., text, image, video, icon, symbol, etc.) to the user. The display 170 may include a touch screen. For example, the display 170 may receive a touch, gesture, proximity, or hovering input by using a stylus pen or a part of a user's body. In an example, the display 170 may comprise a visual interface for configuring the user device 101, the one or more sensor devices 102, and/or the one or more camera devices 103.

The communication interface 170 may establish, for example, communication between the user device 101 and an external device (e.g., the one or more sensor devices 102, the one or more camera devices 103, the one or more electronic devices 104, and/or the server 106). For example, the communication interface 170 may communicate with the external device (e.g., the one or more sensor devices 102, the one or more camera devices 103, the one or more electronic devices 104, and/or the server 106) by being connected to a network 162 via wireless communication or wired communication. For example, as a cellular communication protocol, the wireless communication may use at least one of Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. In an example, the network 162 may include, for example, at least one of a telecommunications network, a computer network (e.g., LAN or WAN), the internet, and a telephone network.

In addition, the communication interface 170 may communicate with an external device (e.g., the one or more sensor devices 102, the one or more camera devices 103, and/or the one or more electronic devices 104) via wireless communication or wired communication (e.g., via communication path(s) 164, 165, 166). The wireless communication path(s) 164, 165, 166 may include, for example, a near-distance communication. The near-distance communication (e.g., via communication path(s) 164, 165, 166) may include, for example, at least one of Wireless Fidelity (WiFi), Bluetooth, Near Field Communication (NFC), Global Navigation Satellite System (GNSS), and the like. According to a usage region or a bandwidth or the like, the GNSS may include, for example, at least one of Global Positioning System (GPS), Global Navigation Satellite System (Glonass), Beidou Navigation Satellite System (hereinafter, "Beidou"), Galileo, the European global satellite-based navigation system, and the like. Hereinafter, the "GPS" and the "GNSS" may be used interchangeably in the present document. The wired communication (e.g., via communication path(s) 164, 165, 166) may include, for example, at least one of Universal Serial Bus (USB), High Definition Multimedia Interface (HDMI), Recommended Standard-232 (RS-232), power-line communication, Plain Old Telephone Service (POTS), and the like.

The server 106 may comprise a group of one or more servers. In an example, all or some of the operations executed by the user device 101 may be executed in a different one or a plurality of electronic devices (e.g., the one or more sensor devices 102, the one or more camera devices 103, the one or more electronic devices 104, the server 106, or a combination thereof). In an example, if the user device 101 needs to perform a certain function or service either automatically or based on a request, the user device 101 may request at least some parts of functions related thereto alternatively or additionally to a different electronic device (e.g., the one or more sensor devices 102, the one or more camera devices 103, the one or more electronic devices 104, and/or the server 106) instead of executing the function or the service autonomously. The different electronic devices (e.g., the one or more sensor devices 102, the one or more camera devices 103, the one or more electronic devices 104, and/or the server 106) may execute the requested function or additional function, and may deliver a result thereof to the user device 101. The user device 101 may provide the requested function or service either directly or by additionally processing the received result. For example, a cloud computing, distributed computing, or client-server computing technique may be used.

Figure 2:
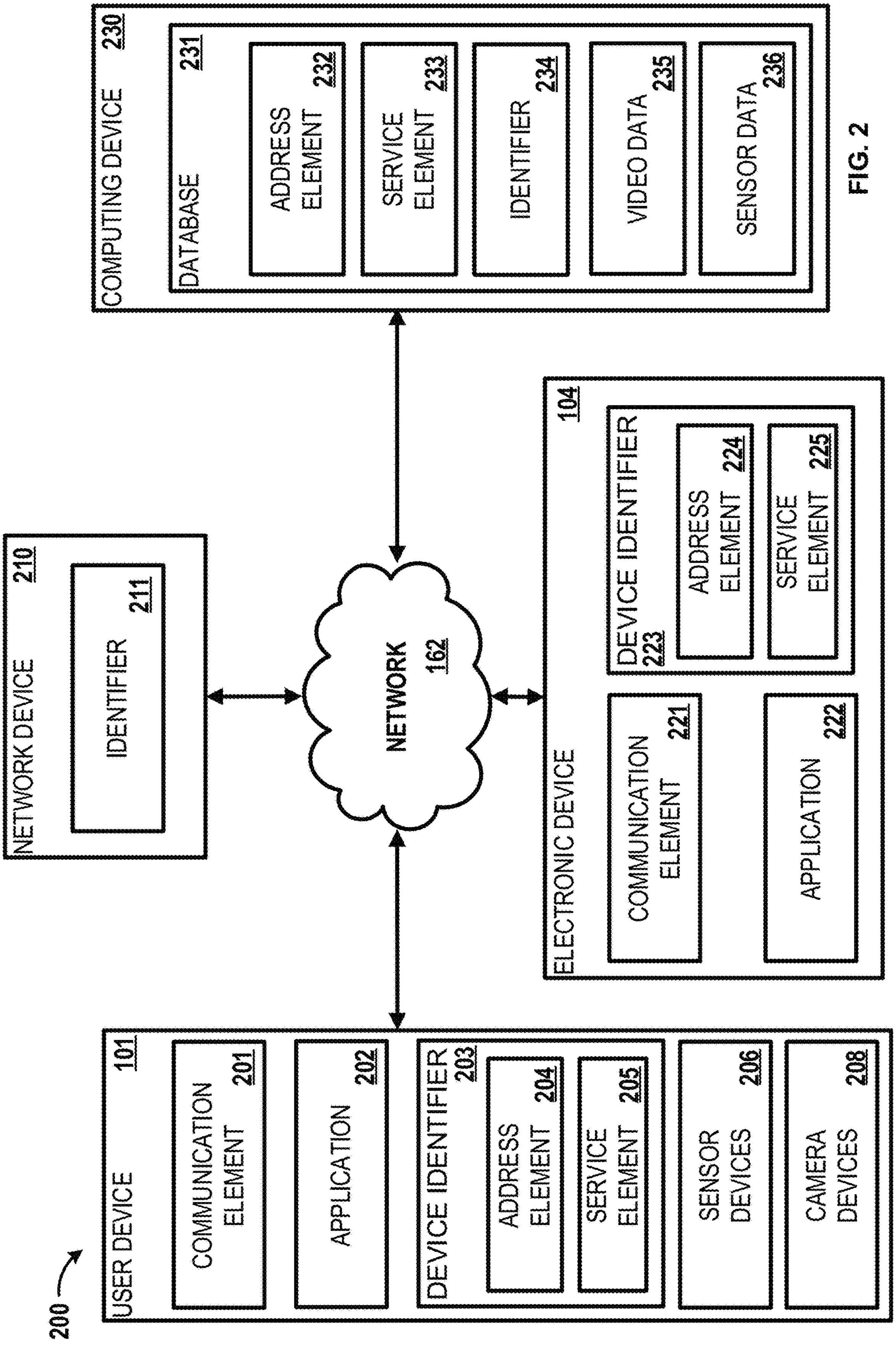
FIG. 2 shows an example system for controlling one or more camera devices.

FIG. 2 shows an example system 200 for controlling one or more camera devices associated with a user. The system 200 may be configured to provide services, such as network-related services, to a user device 101, an electronic device 104, and/or a network device 210. The network and system may comprise the user device 101 and the electronic device 104 in communication with a computing device 230, such as a server, via a network 105. The computing device 230 may be disposed locally or remotely relative to the device 102. As an example, the user device 101, the electronic device 104, and the computing device 230 can be in communication via a private and/or public network 162 such as the Internet or a local area network (LAN). Other forms of communications can be used such as wired and wireless telecommunication channels, for example.

The user device 101 may comprise an electronic device such a mobile device, a smartphone, a tablet computer, a wearable device, or other device capable of communicating with the computing device 230.

The user device 101 may comprise a communication element 201 for providing an interface to a user to interact with the user device 101, the electronic device 104, the network device 210, and/or the computing device 230. The communication element 201 can be any interface for presenting and/or receiving information to/from the user, such as user feedback. An example interface may be a communication interface such as a web browser (e.g., Internet Explorer®, Mozilla Firefox®, Google Chrome®, Safari®, or the like). Other software, hardware, and/or interfaces can be used to provide communication between the user and one or more of the device 102, the electronic device 104, the network device 210, and the computing device 230. As an example, the communication element 201 can request or query various files from a local source and/or a remote source. As an example, the communication element 201 can transmit data to a local or remote device such as the computing device 230.

The user device 101 may be associated with a user identifier or a device identifier 203. As an example, the device identifier 203 may be any identifier, token, character, string, or the like, for differentiating one user or user device (e.g., user device 101) from another user or user device. In an example, the device identifier 203 may identify a user or user device as belonging to a particular class of users or user devices. As an example, the device identifier 203 may comprise information relating to the user device 101 such as a manufacturer, a model or type of device, a service provider associated with the user device 101, a state of the user device 101, a locator, and/or a label or classifier. Other information can be represented by the device identifier 203.

The device identifier 203 may comprise an address element 204 and a service element 205. In an example, the address element 204 can comprise or provide an internet protocol address, a network address, a media access control (MAC) address, international mobile equipment identity (IMEI) number, international portable equipment identity (IPEI) number, an Internet address, or the like. As an example, the address element 204 can be relied upon to establish a communication session between the user device 101, the electronic device 104, and the computing device 230 or other devices and/or networks. As an example, the address element 204 can be used as an identifier or locator of the user device 101. In an example, the address element 204 can be persistent for a particular network.

The service element 205 may comprise an identification of a service provider associated with the user device 101, with the class of the user device 101, and/or with a particular network 162 with which the user device 101 is currently accessing services associated with the service provider. The class of the user device 101 may be related to a type of device, capability of device, type of service being provided, and/or a level of service (e.g., business class, service tier, service package, etc.). As an example, the service element 205 may comprise information relating to or provided by a communication service provider (e.g., Internet service provider) that is providing or enabling data flow such as communication services to the user device 101. As an example, the service element 205 may comprise information relating to a preferred service provider for one or more particular services relating to the user device 101. In an example, the address element 204 can be used to identify or retrieve data from the service element 205, or vice versa. As an example, one or more of the address element 204 and the service element 205 may be stored remotely from the user device 101 and retrieved by one or more devices such as the user device 101 and the computing device 230. Other information may be represented by the service element 205.

The user device 101 may further comprise one or more sensor devices 206 (e.g., the sensor devices 102), one or more camera devices 208 (e.g., the camera devices 103), and an application program 202 that may include logic (e.g., hardware, software, firmware, etc.) that may be implemented for controlling the one or more sensor devices 102 and/or the one or more camera devices 208. The user device 101 may receive sensor data from the one or more sensor devices 206. The one or more sensor devices 206 may comprise one or more of a heart rate monitor, an accelerometer, a temperature sensor, and/or a GPS sensor. In an example, the user device 101, the one or more sensor devices 206, and/or the one or more camera devices 208 may be integrated into a single device. In an example, the one or more camera devices 208 may be separate devices that may be affixed to one or more locations of a user of the user device 101. For example, the one or more camera devices 208 may be integrated into a jewelry item so that it can be hidden from plane sight. The application program 202 may cause the user device 101 to determine one or more conditions associated with a user based on the sensor data. For example, the user device 101 may determine an increase in a heart rate of the user, a speed of the user, a parental override command, a location of the user, a body temperature of the user, a blood pressure of the user, or an indication of device tampering. The one or more sensor devices 206 may be affixed to one or more locations of the user in order to monitor one or more characteristics of the user (e.g., heart rate, location, temperature, blood pressure, etc.). In an example, the one or more sensor devices 206 may be configured to determine whether the user device 101, the one or more sensor devices 206, and/or the camera device 208 are being tampered with. Based on the one or more conditions associated with the user, the application program 202 may cause the user device 101 to cause the one or more camera devices 208 and activate to capture video data of an environment in a field of view of each camera device 208 of the one or more camera devices 208. In an example, the one or more camera devices 208 may be activated if the one or more sensor devices 206 provide sensor data indicating an elevated, or increased, heart rate of the user of the user device 101. In an example, the one or more camera devices 208 may be activated if the one or more sensor devices 206 provide sensor data indicating that the user of the user device 101 is traveling above a threshold speed. In an example, the one or more camera devices 208 may be activated if the one or more sensor devices 206 provide sensor data indicating that the user of the user device 101 has entered or exited a location. In an example, the one or more camera devices 208 may be activated if the one or more sensor devices 206 provide sensor data indicating that a body temperature of the user of the user device 101 is above or below a threshold temperature. In an example, the one or more camera devices 208 may be activated if the one or more sensor devices 206 provide sensor data indicating that a blood pressure of the user of the user device 101 is above or below a threshold blood pressure. In an example, the one or more camera devices 208 may be activated if the one or more sensor devices 206 provide sensor data indicating tampering of the user device 101, the one or more sensor devices 206, and/or the one or more camera devices 208.

In an example, the one or more conditions may be customized based on user input for triggering the one or more camera devices 208 to activate. For example, a user with admin privileges (e.g., a parent) of the user device 101 may provide input via the user device 101 for determining when to activate the one or more camera devices 208. For example, a parent may be authenticated by the user device 101 by signing in with a username and password associated with the parent to the user device 101 and/or the application 202 of the user device 101. For example, the username and password may be stored in a database of a computing device (e.g., computing device 230), wherein the username and password may be associated with the parent in the database, wherein the computing device may access the database in order to authenticate the parent based on the user device 101 sending a request to the computing device to authenticate the parent when the parent signs into the user device 101 and/or the application 202 of the user device 101. In an example, the user may provide input to apply a weight to each of the one or more conditions. As an example, the user device 101 may be associated with (e.g., belong to) a child (e.g., a child of the parent). In an example, a user of the user device 101 may activate a panic device (e.g., panic button) that causes the user device 101 to activate the one or more camera devices 208 (e.g., an indication to activate the one or more camera devices 208). In an example, a user may provide input assigning a higher weight to a body temperature of a user of the user device 101 versus a speed of the user of the user device 101. In another example, the one or more camera devices 208 may be activated based on the user device 101 exiting or entering one or more locations. For example, the user with admin privileges may provide input via the user device 101 for designating one or more locations (e.g., by drawing a boundary, such as a geo-fence, via the application 202) for which the user may enter or exit in order to trigger the user device 101 to activate the one or more camera devices 208.

The application program 202 may cause the user device 101 to cause the video data to be stored on a storage device associated with the user device 101. In an example, the application program 202 may cause the user device 101 to output a live video stream captured by the one or more camera devices 206. In an example, the application program 202 may cause the user device 101 to send the video data to the electronic device 104. For example, when the user device 101 activates the one or more camera devices 103, the video data may be sent to the electronic device 104 in order for a parent of the electronic device 104 to monitor a child of the user device 101. As an example, the video data may be pushed to one or more users associated with a contact list stored on the user device 101 and/or the electronic device 104. As an example, the video data may be streamed via one or more social media platforms. In an example, the application program 202 may cause the user device 101 to cause the one or more camera devices 103 to activate night vision based on content of the video data. For example, night vision may be activated to enhance the video data when it determined that the environment being captured is not light enough to identify objects and/or individuals in the video data (e.g., below a brightness threshold).

The electronic device 104 may comprise an electronic device such a mobile device, a smartphone, a tablet computer, a wearable device, or other device capable of communicating with the computing device 230.

The electronic device 104 may comprise a communication element 221 for providing an interface to a user to interact with the electronic device 104, the user device 101, the network device 210, and/or the computing device 230. The communication element 221 can be any interface for presenting and/or receiving information to/from the user, such as user feedback. An example interface may be a communication interface such as a web browser (e.g., Internet Explorer®, Mozilla Firefox®, Google Chrome®, Safari®, or the like). Other software, hardware, and/or interfaces can be used to provide communication between the user and one or more of the electronic device 104, the device 102, the network device 210, and the computing device 230. As an example, the communication element 221 can request or query various files from a local source and/or a remote source. As an example, the communication element 221 can transmit data to a local or remote device such as the computing device 230.

The electronic device 104 may be associated with a user identifier or a device identifier 223. As an example, the device identifier 223 may be any identifier, token, character, string, or the like, for differentiating one user or user device (e.g., user device 101) from another user or user device. In an example, the device identifier 223 may identify a user or user device as belonging to a particular class of users or user devices. As an example, the device identifier 223 may comprise information relating to the electronic device 104 such as a manufacturer, a model or type of device, a service provider associated with the electronic device 104, a state of the electronic device 104, a locator, and/or a label or classifier. Other information can be represented by the device identifier 223.

The device identifier 223 may comprise an address element 224 and a service element 225. In an example, the address element 224 can comprise or provide an internet protocol address, a network address, a media access control (MAC) address, international mobile equipment identity (IMEI) number, international portable equipment identity (IPEI) number, an Internet address, or the like. As an example, the address element 224 can be relied upon to establish a communication session between the electronic device 104, the user device 101, and the computing device 230 or other devices and/or networks. As an example, the address element 224 can be used as an identifier or locator of the electronic device 104. In an example, the address element 224 can be persistent for a particular network.

The service element 225 may comprise an identification of a service provider associated with the electronic device 104, with the class of the electronic device 104, and/or with a particular network 162 with which the electronic device 104 is currently accessing services associated with the service provider. The class of the electronic device 104 may be related to a type of device, capability of device, type of service being provided, and/or a level of service (e.g., business class, service tier, service package, etc.). As an example, the service element 225 may comprise information relating to or provided by a communication service provider (e.g., Internet service provider) that is providing or enabling data flow such as communication services to the electronic device 104. As an example, the service element 225 may comprise information relating to a preferred service provider for one or more particular services relating to the electronic device 104. In an example, the address element 224 can be used to identify or retrieve data from the service element 225, or vice versa. As an example, one or more of the address element 224 and the service element 225 may be stored remotely from the electronic device 104 and retrieved by one or more devices such as the electronic device 104 and the computing device 230. Other information may be represented by the service element 225.

The electronic device 104 may further comprise an application 222. The application program 222 may include logic (e.g., hardware, software, firmware, etc.) that may be implemented for interacting with the user device 101. For example, a user of the electronic device 104 may provide input, via the application 222, for determining when to activate the one or more camera devices 206. For example, the user may provide input, via the application 222, to apply a weight to each of the one or more conditions. As an example, the electronic device 104 may be associated with (e.g., belong to) one or more parents or adults associated with the child of the user device 101. For example, a parent may be authenticated by the electronic device 104 by signing in with a username and password associated with the parent to the electronic device 104 and/or the application 222 of the electronic device 104. For example, the username and password may be stored in a database of a computing device (e.g., computing device 230), wherein the username and password may be associated with the parent in the database, wherein the computing device may access the database in order to authenticate the parent based on the electronic device 104 sending a request to the computing device to authenticate the parent when the parent signs into the electronic device 104 and/or the application 222 of the electronic device 104. As an example, the parent may provide an override input via the application 222 to cause the user device 101 to cause one or more of the camera devices 103 to activate (e.g., an indication to activate the one or more camera devices 206). In an example, the parent may provide input, via the application 222, assigning a higher weight to the body temperature of the user of the user device 101 versus the speed of the user of the user device 101. In another example, the one or more camera devices 103 may be activated based on the user device 101 exiting or entering one or more locations. For example, a user of the electronic device 104 may provide input for designating one or more locations (e.g., by drawing a boundary, such as a geo-fence, via the application 222 of the electronic device 104) for which the user may enter or exit in order to trigger the user device 101 to activate the one or more camera devices 206.

A network device 210 may be in communication with a network, such as the network 162. For example, the network device 210 may facilitate the connection of a device (e.g., device 102) to the network 162. As an example, the network device 210 may be configured as a set-top box, a gateway device, or wireless access point (WAP). In an example, the network device 210 may be configured to allow one or more wireless devices to connect to a wired and/or wireless network using Wi-Fi, Bluetooth®, Zigbee®, or any desired method or standard.

The network device 210 may comprise an identifier 211. As an example, the identifier 211 may be or relate to an Internet Protocol (IP) Address (e.g., IPV4/IPV6) or a media access control address (MAC address) or the like. As an example, the identifier 211 may be a unique identifier for facilitating communications on the physical network segment. In an example, the network device 210 may comprise a distinct identifier 211. As an example, the identifier 211 may be associated with a physical location of the network device 210.

The computing device 230 may comprise a server for communicating with the user device 101, the electronic device 104, and/or a network device 210. As an example, the computing device 230 may communicate with the user device 101 and/or the electronic device 104 for providing data and/or services. As an example, the computing device 230 may provide services, such as network (e.g., Internet) connectivity, network printing, media management (e.g., media server), content services, streaming services, broadband services, or other network-related services. As an example, the computing device 230 may allow the user device 101 and/or the electronic device 104 to interact with remote resources, such as data, devices, and files. As an example, the computing device 230 may be configured as (or disposed at) a central location (e.g., a headend, or processing facility), which may receive content (e.g., data, input programming) from multiple sources. The computing device 230 may combine the content from the multiple sources and may distribute the content to user (e.g., subscriber) locations via a distribution system.

The computing device 230 may be configured to manage the communication between the user device 101 and/or the electronic device 104 and a database 231 for sending and receiving data therebetween. As an example, the database 231 may store a plurality of files (e.g., web pages), user identifiers or records (e.g., video data 235 and/or sensor data 236), or other information. As an example, the user device 101 may request and/or retrieve a file from the database 231. In an example, the database 231 may store information relating to the user device 101 and/or the electronic device 104 such as the address element 232, the service element 233, the video data 235 and/or the sensor data 236. As an example, the computing device 230 may obtain the device identifier 203 from the user device 101 and retrieve information from the database 231 such as the address element 232, the service element 233, the video data 235 and/or the sensor data 236. As an example, the computing device 230 may obtain the address element 204 from the user device 101 and may retrieve the service element 205 from the database 231, or vice versa. Any information may be stored in and retrieved from the database 231. The database 231 may be disposed remotely from the computing device 230 and accessed via direct or indirect connection. The database 231 may be integrated with the computing device 230 or some other device or system.

Figure 3:
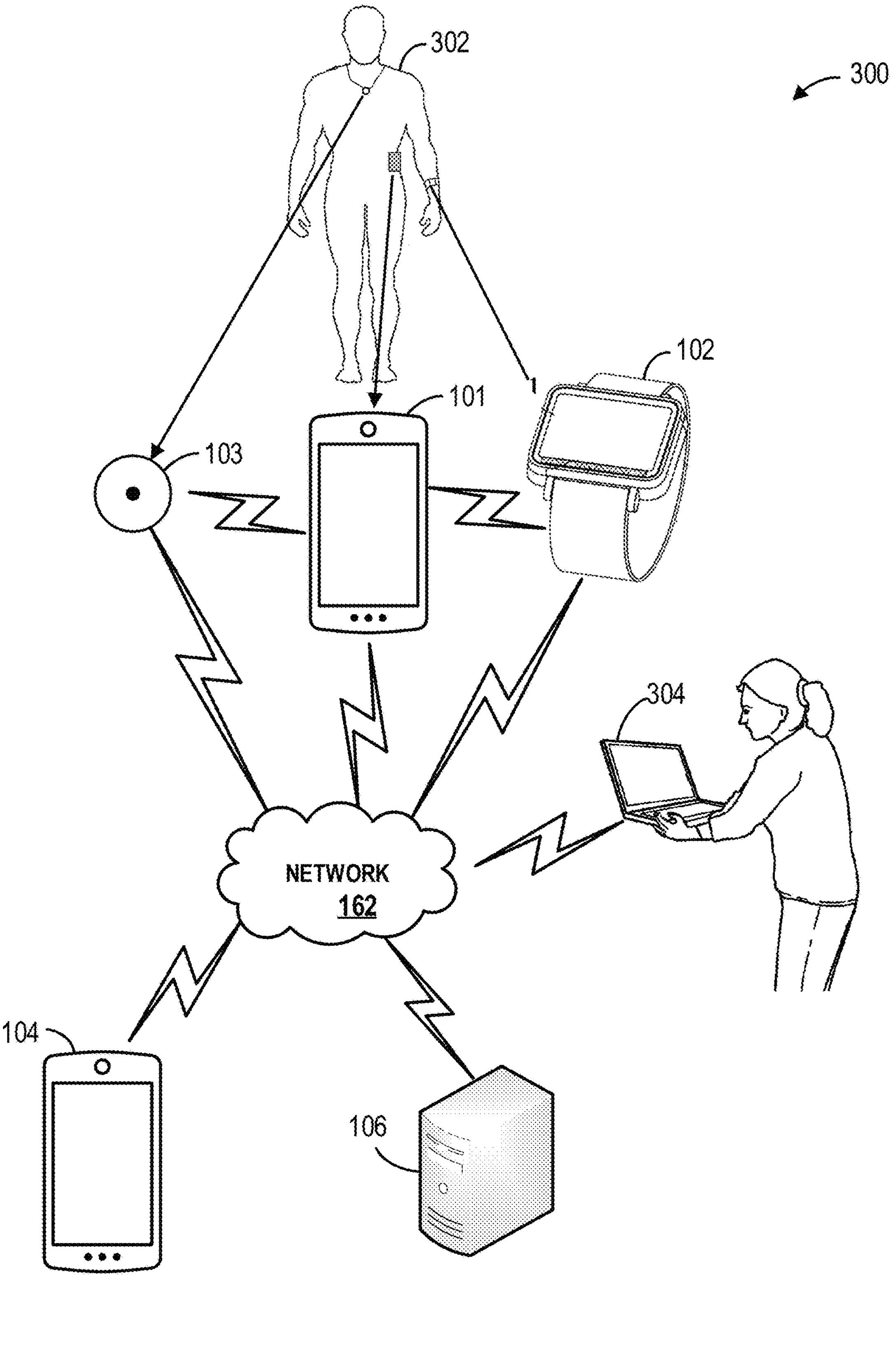
FIG. 3 shows an example system environment for controlling one or more camera devices.

FIG. 3 shows an example system environment 300 for controlling one or more camera devices (e.g., camera devices 103). The system environment 300 may include a user device 101, one or more sensor devices 102 affixed to one or more locations of a user 302, one or more camera devices 103 affixed to one or more locations of the user 302, a first electronic device 104, a server 106, and/or a second electronic device 304. The user device 101, the one or more sensor devices 102, the one or more camera devices 103, the first electronic device 104, the server 106, and/or the second electronic device 304 may be in communication with each other via a network 162. In addition, the user device 101 may be in communication with the one or more sensor devices 102 and/or the one or more camera devices 103 via short-range communication (e.g., Bluetooth, NFC, etc.). In an example, the user device 101, the one or more sensor devices 102, and/or the one or more camera devices 103 may be integrated into a single device. The user device 101 may receive sensor data from the one or more sensor devices 102. The one or more sensor devices 102 may comprise one or more of a heart rate monitor, an accelerometer, a temperature sensor, and/or a GPS sensor. In an example, the one or more camera devices 103 may be integrated into a jewelry item, as shown in FIG. 3, so that it can be hidden from plane sight. The user device 101 may determine one or more conditions associated with a user based on the sensor data. For example, the user device 101 may determine an increase in a heart rate of the user, a speed of the user, a parental override command, a location of the user, a body temperature of the user, a blood pressure of the user, or an indication of device tampering. Based on the one or more conditions associated with the user the user device 101 may cause the one or more camera devices 103 to activate to capture video data of an environment in a field of view of each camera device 103 of the one or more camera devices 103. In an example, the one or more camera devices 103 may be activated if the one or more sensor devices 102 provide sensor data indicating an elevated, or increased, heart rate of the user of the user device 101. In an example, the one or more camera devices 103 may be activated if the one or more sensor devices 102 provide sensor data indicating that the user of the user device 101 is traveling above a threshold speed. In an example, the one or more camera devices 103 may be activated if the one or more sensor devices 102 provide sensor data indicating that the user of the user device 101 has entered or exited a location. In an example, the one or more camera devices 103 may be activated if the one or more sensor devices 102 provide sensor data indicating that a body temperature of the user of the user device 101 is above or below a threshold temperature. In an example, the one or more camera devices 103 may be activated if the one or more sensor devices 102 provide sensor data indicating that a blood pressure of the user of the user device 101 is above or below a threshold blood pressure. In an example, the one or more camera devices 103 may be activated if the one or more sensor devices 102 provide sensor data indicating tampering of the user device 101, the one or more sensor devices 102, and/or the one or more camera devices 103.

In an example, the one or more conditions may be customized based on user input for triggering the one or more camera devices 103 to activate. For example, a user of the first electronic device 104 and/or the second electronic device 304 may provide input for determining when to activate the one or more camera devices 103. For example, a parent may be authenticated (e.g., by the user device 101, the first electronic device 104, and/or the second electronic device 304) by signing in with a username and password associated with the parent. For example, the username and password may be stored in a database of a computing device (e.g., server 106), wherein the username and password may be associated with the parent in the database, wherein the computing device may access the database in order to authenticate the parent based on a request sent to the computing device (e.g., by the user device 101, the first electronic device 104, and/or the second electronic device 304) to authenticate the parent when the parent signs into a device (e.g., the user device 101, the first electronic device 104, and/or the second electronic device 304). As an example, the user may provide input to apply a weight to each of the one or more conditions. As an example, the first electronic device 104 and/or the second electronic device 304 may be associated with (e.g., belong to) one or more parents or adults and the user device 101 may be associated with (e.g., belong to) a child (e.g., a child of the parent). As an example, the parent may provide an override input via one of the first electronic device 104 or the second electronic device 304 to cause one or more of the camera devices 103 to activate (e.g., an indication to activate the one or more camera devices 103). In another example, a user of the user device 101 may activate a panic device (e.g., panic button) that causes the user device 101 to activate the one or more camera devices 103 (e.g., an indication to activate the one or more camera devices 103). In an example, a user may provide input assigning a higher weight to a body temperature of a user of the user device 101 versus a speed of the user the user device 101. In another example, the one or more camera devices 103 may be activated based on the user device 101 exiting or entering one or more locations. For example, a user of the first electronic device 104 and/or the second electronic device 304 may provide input for designating one or more locations (e.g., by drawing a boundary, such as a geo-fence, via an application of the first electronic device 104 and/or an application of the second electronic device 304) for which the user may enter or exit in order to trigger the user device 101 to activate the one or more camera devices 103.

The user device 101 may cause the video data to be stored on a storage device associated with the user device 101 and/or the server 106. In an example, the user device 101 may output a live video stream captured by the one or more camera devices 103 to the first electronic device 104 and/or the second electronic device 304. For example, a parent of one of the first electronic device 104 and/or the second electronic device 304 may provide input to the first electronic device 104 and/or the second electronic device 304 to cause the first electronic device 104 and/or the second electronic device 304 to monitor the user device 101. In an example, the user device 101 may send the video data to the first electronic device 104 and/or the second electronic device 304. For example, when the user device 101 activates the one or more camera devices 103, the video data may be sent to the first electronic device 104 and/or the second electronic device 304 in order for a parent of the first electronic device 104 and/or the second electronic device 304 to monitor a child of the user device 101. As an example, the video data may be pushed to one or more users associated with a contact list stored on the user device 101 and/or the first electronic device 104 and/or the second electronic device 304. As an example, the video data may be streamed via one or more social media platforms. In an example, the user device 101 may cause the one or more camera devices 103 to activate night vision based on content of the video data. For example, night vision may be activated to enhance the video data when it determined that the environment being captured is not light enough to identify objects and/or individuals in the video data (e.g., below a brightness threshold).

Figure 4:
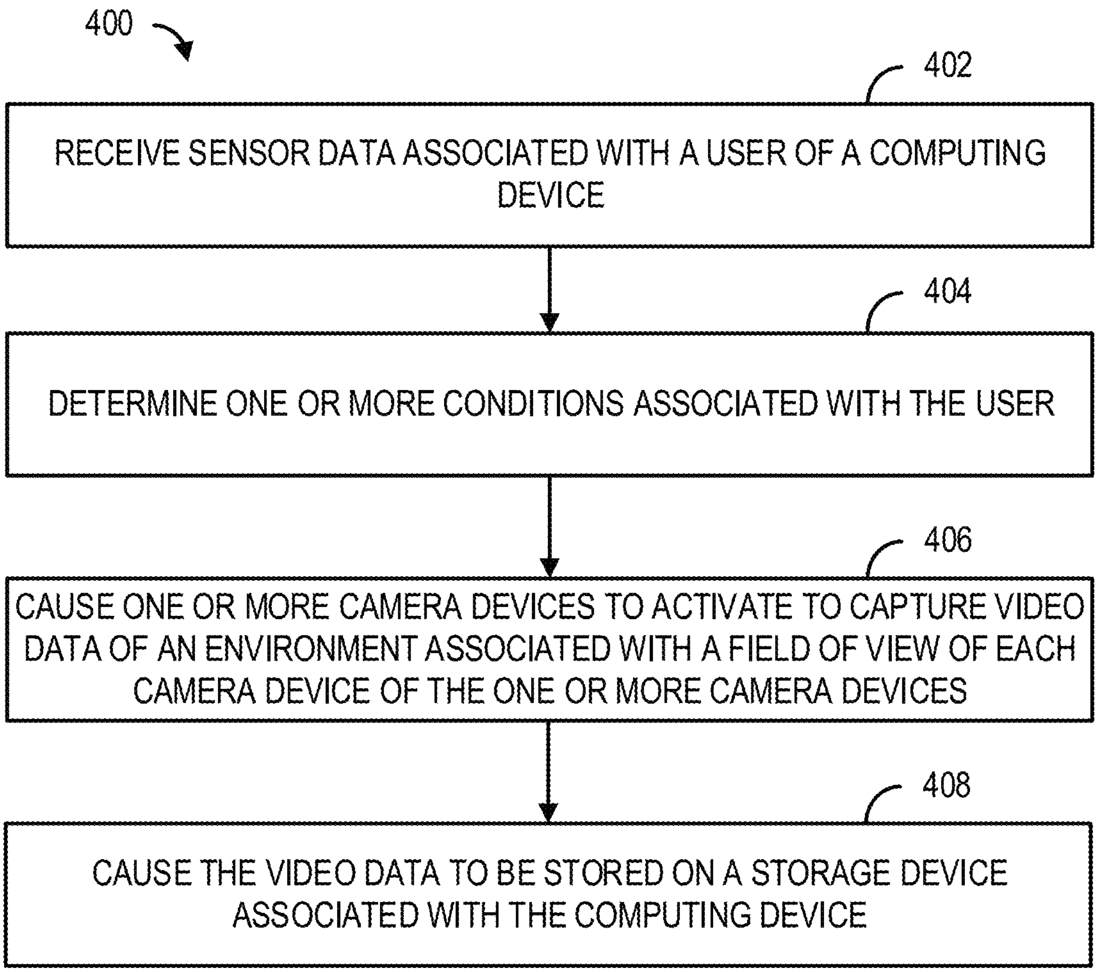
FIG. 4 shows a flowchart of an example method.

FIG. 4 shows a flowchart of an example method 400. The method 400 may be implemented by a computing device such as the user device 101, the one or more sensor devices 102, the one or more camera devices 103, the one or more electronic devices 104, combinations thereof, and the like. At step 402, sensor data associated with a user may be received from one or more sensor devices. For example, a computing device (e.g., the user device 101) may receive the sensor data associated with the user of the computing device from the one or more sensor devices. The computing device may comprise one or more of a mobile device, a smartphone, a tablet computer, or a wearable device. The one or more sensor devices may comprise one or more of a heart rate monitor, an accelerometer, a temperature sensor, or a GPS sensor. One or more of the computing device, the one or more sensor devices, or the one or more camera devices may be affixed to one or more locations of the user. The computing device may comprise one or more of the one or more sensor devices or the one or more camera devices. For example, the computing device, the one or more sensor devices, and/or the one or more camera devices may be integrated into a single device.

At step 404, one or more conditions associated with the user may be determined based on the sensor data associated with the user. For example, the computing device (e.g., the user device 101) may determine the one or more conditions associated with the user based on the sensor data associated with the user. The one or more conditions associated with the user may comprise an increase in a heart rate of the user, a speed of the user, a parental override command, a location of the user, a body temperature of the user, a blood pressure of the user, or an indication of device tampering. In an example, causing the one or more camera devices to activate based on the one or more conditions associated with the user may comprise causing the one or more camera devices to activate based on a location of the user relative to a geo-fence.

At step 406, one or more camera devices may be activated to capture video data of an environment associated with a field of view of each camera device of the one or more camera devices based on the one or more conditions associated with the user. For example, the computing device (e.g., the user device 101) may cause the one or more camera devices to activate to capture the video data of the environment associated with the field of view of each camera device of the one or more camera devices based on the one or more conditions associated with the user. The video data may comprise a live video stream of the environment in the field of view of each camera device. In an example, a user device of one or more user devices associated with the computing device may send an indication to activate the one or more camera devices. The one or more sensor devices and the one or more camera devices may be activated to capture sensor data and video data of the environment associated with the field of view of each camera device based on the indication.

At step 408, the video data may be stored on a storage device associated with the computing device. For example, the computing device (e.g., the user device 101) may cause the video data to be stored on a storage device associated with the computing device. In an example, the video data may be sent to the one or more user devices. In an example, the one or more camera devices may activate night vision based on content of the video data. For example, night vision may be activated to enhance the video data when it determined that the environment being captured is not light enough to identify objects and/or individuals in the video data (e.g., below a brightness threshold).

Figure 5:
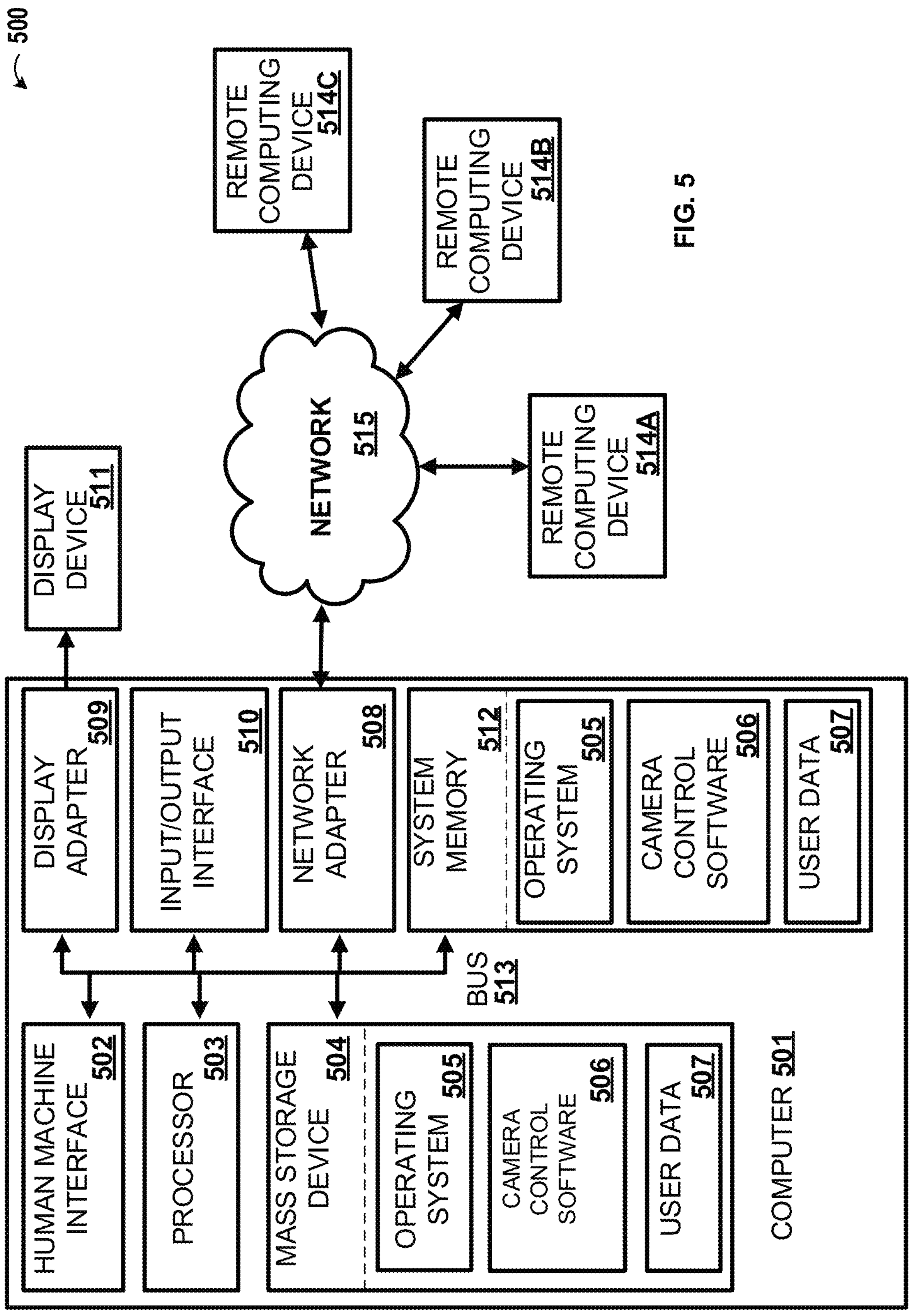
FIG. 5 shows a block diagram of an example system and computing device.

The methods and systems can be implemented on a computer 501 as illustrated in FIG. 5 and described below. By way of example, the user device 101, the one or more electronic devices 104, and/or the server 106 of FIG. 1 and/or the network device 210 and/or the computing device 230 of FIG. 2 can be a computer 501 as illustrated in FIG. 5. Similarly, the methods and systems disclosed can utilize one or more computers to perform one or more functions in one or more locations. FIG. 5 is a block diagram illustrating an example operating environment 500 for performing the disclosed methods. This example operating environment 500 is only an example of an operating environment and is not intended to suggest any limitation as to the scope of use or functionality of operating environment architecture. Neither should the operating environment 500 be interpreted as having any dependency or requirement relating to any one or combination of components illustrated in the example operating environment 500.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media such as memory storage devices.

Further, one skilled in the art will appreciate that the systems and methods disclosed herein can be implemented via a general-purpose computing device in the form of a computer 501. The computer 501 can comprise one or more components, such as one or more processors 503, a system memory 512, and a bus 513 that couples various components of the computer 501 comprising the one or more processors 503 to the system memory 512. The system can utilize parallel computing.

The bus 513 can comprise one or more of several possible types of bus structures, such as a memory bus, memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and one or more of the components of the computer 501, such as the one or more processors 503, a mass storage device 504, an operating system 505, camera control software 506, user data 507, a network adapter 508, the system memory 512, an Input/Output Interface 510, a display adapter 509, a display device 511, and a human machine interface 502, can be contained within one or more remote computing devices 514A-514C at physically separate locations, connected through buses of this form, in effect implementing a fully distributed system.

The computer 501 typically comprises a variety of computer readable media. Examples of readable media can be any available media that is accessible by the computer 501 and comprises, for example and not meant to be limiting, both volatile and non-volatile media, removable and non-removable media. The system memory 512 can comprise computer readable media in the form of volatile memory, such as random access memory (RAM), and/or non-volatile memory, such as read only memory (ROM). The system memory 512 typically can comprise data such as the user data 507 and/or program modules such as the operating system 505 and the camera control software 506 that are accessible to and/or are operated on by the one or more processors 503.

In another aspect, the computer 501 can also comprise other removable/non-removable, volatile/non-volatile computer storage media. The mass storage device 504 can provide non-volatile storage of computer code, computer readable instructions, data structures, program modules, and other data for the computer 501. For example, the mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, such as, by way of example, the operating system 505 and the camera control software 506. One or more of the operating system 505 and the camera control software 506 (or some combination thereof) can comprise elements of the programming and the camera control software 506. The user data 507 can also be stored on the mass storage device 504. The user data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 515.

In another aspect, the user can enter commands and information into the computer 501 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 503 via the human machine interface 502 that is coupled to the bus 513, but can be connected by other interface and bus structures, such as a parallel port, game port, an IEEE 1394 Port (also known as a Firewire port), a serial port, a network adapter 508, and/or a universal serial bus (USB).

In yet another aspect, the display device 511 can also be connected to the bus 513 via an interface, such as the display adapter 509. It is contemplated that the computer 501 can have more than one display adapter 509 and the computer 501 can have more than one display device 511. For example, the display device 511 can be a monitor, an LCD (Liquid Crystal Display), light emitting diode (LED) display, television, smart lens, smart glass, and/or a projector. In addition to the display device 511, other output peripheral devices can comprise components such as speakers (not shown) and a printer (not shown) which can be connected to the computer 501 via an Input/Output Interface 510. Any step and/or result of the methods can be output in any form to an output device. Such output can be any form of visual representation, comprising, but not limited to, textual, graphical, animation, audio, tactile, and the like. The display device 511 and the computer 501 can be part of one device, or separate devices.

The computer 501 can operate in a networked environment using logical connections to one or more remote computing devices 514A-514C. By way of example, a remote computing device 514A-514C can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 501 and a remote computing device 514A-514C can be made via a network 515, such as a local area network (LAN) and/or a general wide area network (WAN). Such network connections can be through the network adapter 508. The network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components can reside at various times in different storage components of the computing device 501, and are executed by the one or more processors 503 of the computer 501. An implementation of the camera control software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise “computer storage media” and “communications media.” “Computer storage media” can comprise volatile and non-volatile, removable and non-removable media implemented in any methods or technology for storage of information such as computer readable instructions, data structures, program modules, or other data. Example computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

For purposes of illustration, application programs and other executable program components are illustrated herein as discrete blocks, although it is recognized that such programs and components can reside at various times in different storage components. An implementation of the described methods can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise “computer storage media” and “communications media.” “Computer storage media” can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A system comprising:

one or more sensor devices affixed to one or more first locations on a user, wherein the one or more sensor devices are configured to determine sensor data associated with a plurality of characteristics associated with a plurality of conditions associated with the user, wherein the plurality of characteristics comprise a heart rate, a speed, a parental override command, a location, a body temperature, a blood pressure, and an indication of device tampering;

one or more camera devices affixed to one or more second locations on the user, wherein the one or more camera devices are integrated into one or more jewelry items worn by the user and are configured to capture video data of a surrounding environment of the user associated with an outward-facing field of view, from the user, of each camera device of the one or more camera devices, wherein the one or more camera devices are separate devices from the one or more sensor devices, and wherein the one or more first locations are different locations than the one or more second locations; and a computing device affixed to a third location on the user, wherein the computing device is a separate device from the one or more sensor devices and the one or more camera devices, wherein the third location is a different location than the one or more first locations and the one or more second locations, wherein the computing device is in communication with the one or more sensor devices and the one or more camera devices, wherein the computing device is configured to:

assign a weight to each condition of the plurality of conditions, adjust, based on receiving user input, each weight assigned to each condition, receive, from the one or more sensor devices, the sensor data associated with the plurality of characteristics, determine, based on the sensor data associated with the plurality of characteristics, one or more weighted conditions of the plurality of weighted conditions satisfy one or more thresholds, based on the one or more weighted conditions satisfying the one or more thresholds, cause the one or more camera devices to activate to capture video data of the environment associated with the outward-facing field of view of each camera device, cause the video data to be stored on a storage device associated with the computing device, determine, based on user authentication information, a first user device associated with an authorized user, cause the video data to be output as a live video stream to the first user device associated with the authorized user, determine, based on data indicative of a contact list associated with the user, one or more second user devices associated with one or more additional users, and push the video data to the one or more second user devices associated with the one or more additional users.

2. The system of claim 1, wherein the computing device comprises one or more of a mobile device, a smartphone, a tablet computer, or a wearable device.

3. The system of claim 1, wherein the one or more sensor devices comprise one or more of a heart rate monitor, an accelerometer, a temperature sensor, or a GPS sensor.

4. The system of claim 1, wherein the plurality of conditions associated with the user comprise an increase in a heart rate of the user, a speed of the user, a parental override command, a location of the user, a body temperature of the user, a blood pressure of the user, or an indication of device tampering.

5. The system of claim 1, wherein the computing device is configured to, based on the one or more weighted conditions satisfying the one or more thresholds, cause the one or more camera devices to activate, the computing device is configured to, based on a location of the user relative to a geo-fence, cause the one or more camera devices to activate.

6. The system of claim 1, wherein the user authentication information comprises one or more of a username or a password.

7. The system of claim 1, wherein the computing device is further configured to:

receive an indication to activate the one or more camera devices, wherein the indication is associated with one or more of an override input received at a user device of one or more user devices associated with the computing device or a panic input received by the computing device; and cause, based on the indication, the one or more sensor devices to activate to capture sensor data and the one or more camera devices to activate to capture video data of the environment associated with the outward-facing field of view of each camera device.

8. The system of claim 6, wherein the user authentication information is stored in a database.

9. The system of claim 1, wherein the computing device is further configured to cause, based on content of the video data, the one or more camera devices to activate night vision.

10. A method comprising:

receiving, by a computing device affixed to a first location on a user, from one or more sensor devices affixed to one or more second locations on the user, sensor data associated with a plurality of characteristics associated with a plurality of conditions associated with the user, wherein the plurality of characteristics comprise a heart rate, a speed, a parental override command, a location, a body temperature, a blood pressure, and an indication of device tampering, wherein the first location is a different location than the one or more second locations, and wherein the computing device is a separate device from the one or more sensor devices;

assigning a weight to each condition of the plurality of conditions;

adjusting, based on receiving user input, each weight assigned to each condition;

determining, based on the sensor data associated with the plurality of characteristics, one or more weighted conditions of the plurality of weighted conditions satisfy one or more thresholds;

based on the one or more weighted conditions satisfying the one or more thresholds, causing one or more camera devices, affixed to one or more third locations on the user, to activate to capture video data of a surrounding environment of the user associated with an outward-facing field of view, from the user, of each camera device of the one or more camera devices, wherein the one or more camera devices are integrated into one or more jewelry items worn by the user, wherein the one or more camera devices are separate devices from the computing device and the one or more sensor devices, and wherein the first location is a different location than the one or more second locations and the one or more third locations;

causing the video data to be stored on a storage device associated with the computing device;

determining, based on user authentication information, a first user device associated with an authorized user;

causing the video data to be output as a live video stream to the first user device associated with the authorized user;

determining, based on data indicative of a contact list associated with the user, one or more second user devices associated with one or more additional users; and pushing the video data to the one or more second user devices associated with the one or more additional users.

11. The method of claim 10, wherein the computing device comprises one or more of a mobile device, a smartphone, a tablet computer, or a wearable device.

12. The method of claim 10, wherein the one or more sensor devices comprise one or more of a heart rate monitor, an accelerometer, a temperature sensor, or a GPS sensor.

13. The method of claim 10, further comprising: receiving, from a user device, the user authentication information.

14. The method of claim 10, wherein the plurality of conditions associated with the user comprise an increase in a heart rate of the user, a speed of the user, a parental override command, a location of the user, a body temperature of the user, a blood pressure of the user, or an indication of device tampering.

15. The method of claim 10, wherein, based on the one or more weighted conditions satisfying the one or more thresholds, causing the one or more camera devices to activate comprises based on a location of the user relative to a geo-fence, causing the one or more camera devices to activate.

16. The method of claim 10, wherein the user authentication information comprises one or more of a username or a password.

17. The method of claim 10, further comprising:

receiving, by the computing device, an indication to activate the one or more camera devices; and causing, based on the indication, the one or more sensor devices to activate to capture sensor data and the one or more camera devices to activate to capture video data of the environment associated with the outward-facing field of view of each camera device.

18. The method of claim 17, wherein the indication is associated with one or more of an override input received at a user device of one or more user devices associated with the computing device or a panic input received by the computing device.

19. The method of claim 16, wherein the user authentication information is stored in a database.

20. The method of claim 10, further comprising causing, based on content of the video data, the one or more camera devices to activate night vision.

* * * * *